US010931686B1

(12) United States Patent
Mehta et al.

(10) Patent No.: US 10,931,686 B1
(45) Date of Patent: Feb. 23, 2021

(54) DETECTION OF AUTOMATED REQUESTS USING SESSION IDENTIFIERS

(71) Applicant: Stealth Security, Inc., Mountain View, CA (US)

(72) Inventors: Shreyans Mehta, Los Altos, CA (US); Mayank Dhiman, Mountain View, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 255 days.

(21) Appl. No.: 15/886,628

(22) Filed: Feb. 1, 2018

Related U.S. Application Data

(60) Provisional application No. 62/453,280, filed on Feb. 1, 2017.

(51) Int. Cl.
*H04L 29/06* (2006.01)
*H04L 12/26* (2006.01)
*H04L 29/08* (2006.01)

(52) U.S. Cl.
CPC .......... *H04L 63/1416* (2013.01); *H04L 43/16* (2013.01); *H04L 63/10* (2013.01); *H04L 67/146* (2013.01)

(58) Field of Classification Search
CPC ..... H04L 63/1416; H04L 63/10; H04L 43/16; H04L 67/146
USPC .......................................................... 726/23
See application file for complete search history.

(56) References Cited

U.S. PATENT DOCUMENTS 7,380,708 B1 6/2008 Kiliccote
7,784,099 B2 8/2010 Benjamin
7,814,542 B1 10/2010 Day
7,886,032 B1 2/2011 Louz-On
7,886,217 B1 2/2011 Henzinger et al.
7,975,296 B2 7/2011 Apfelbaum et al.
8,151,327 B2 4/2012 Eisen
8,244,799 B1 8/2012 Salusky et al.
8,307,099 B1 11/2012 Khanna et al.
(Continued)

FOREIGN PATENT DOCUMENTS

JP 2007-208861 A 8/2007
WO 2006/031302 A1 3/2006
(Continued)

OTHER PUBLICATIONS

Wikipedia, "Session ID", (2017) Retrieved on the Internet at https://en.wikipedia.org/wiki/Session_ID, retrieved on Feb. 1, 2018, 2 pages.
(Continued)

*Primary Examiner* — Mohammad W Reza

(57) ABSTRACT

A method to facilitate detection of automated attacks on a web service is disclosed. Some embodiments of the method can include binding a session identifier to a user session with the web service. The method can further include receiving a plurality of web requests during the user session that include the session identifier. The plurality of web requests can then be processed with a set of automation detection heuristics to identify session attributes associated with the session identifier during the user session. The method can further include detecting that the session identifier is associated with an automated attack when at least one of the session attributes associated with the session identifier exceeds a threshold amount.

20 Claims, 6 Drawing Sheets

(56) References Cited

U.S. PATENT DOCUMENTS 8,606,900 B1 12/2013 Levergood et al.
8,621,065 B1 * 12/2013 Saurel ................. H04L 63/1466 709/200
8,646,081 B1 2/2014 Xue et al.
8,819,819 B1 8/2014 Johnston et al.
8,856,869 B1 10/2014 Brinskelle
8,893,270 B1 11/2014 Yang et al.
9,038,148 B1 5/2015 Roth et al.
9,231,964 B2 1/2016 Cross et al.
9,253,011 B2 2/2016 Chapman et al.
9,348,742 B1 5/2016 Brezinski
9,485,262 B1 11/2016 Kahn et al.
9,646,140 B2 5/2017 Horadan
9,692,833 B2 6/2017 Kruglick
9,749,305 B1 8/2017 Sharifi Mehr et al.
9,754,311 B2 9/2017 Eisen
10,237,298 B1 * 3/2019 Nguyen .................. H04L 67/14
10,291,589 B1 5/2019 Sharifi Mehr
2004/0098609 A1 5/2004 Bracewell et al.
2005/0063377 A1 3/2005 Bryant et al.
2006/0031680 A1 2/2006 Maiman
2006/0117386 A1 6/2006 Gupta et al.
2007/0005648 A1 1/2007 Armanino et al.
2008/0005782 A1 1/2008 Aziz
2008/0162679 A1 7/2008 Maher et al.
2008/0229109 A1 9/2008 Gantman et al.
2010/0125900 A1 5/2010 Dennerline et al.
2010/0169476 A1 7/2010 Chandrashekar et al.
2010/0191972 A1 7/2010 Kiliccote
2010/0192201 A1 * 7/2010 Shimoni ............. H04L 63/1458 726/3
2011/0013527 A1 1/2011 Varadarajan et al.
2011/0239300 A1 9/2011 Klein et al.
2011/0269437 A1 11/2011 Marusi et al.
2011/0283361 A1 11/2011 Perdisci et al.
2012/0144026 A1 6/2012 Conlon et al.
2012/0240185 A1 9/2012 Kapoor et al.
2012/0291129 A1 11/2012 Shulman et al.
2013/0031621 A1 1/2013 Jenne et al.
2013/0036472 A1 2/2013 Aziz
2013/0055375 A1 2/2013 Cline et al.
2013/0097699 A1 4/2013 Balupari et al.
2013/0195457 A1 8/2013 Levy et al.
2013/0227674 A1 8/2013 Anderson
2013/0246630 A1 9/2013 Exton et al.
2013/0282922 A1 10/2013 Milstead
2013/0315241 A1 11/2013 Kamat et al.
2014/0101764 A1 4/2014 Montoro
2014/0189864 A1 7/2014 Wang et al.
2015/0096023 A1 4/2015 Mesdaq et al.
2015/0180893 A1 6/2015 Im et al.
2015/0326674 A1 * 11/2015 Kruglick ................. H04L 67/02 709/224
2016/0110549 A1 4/2016 Schmitt
2016/0149953 A1 5/2016 Hidayat
2016/0173526 A1 6/2016 Kasman et al.
2016/0197947 A1 7/2016 Im et al.
2016/0241592 A1 8/2016 Kurkure et al.
2016/0308898 A1 10/2016 Teeple et al.
2017/0041334 A1 2/2017 Kahn et al.
2017/0134397 A1 5/2017 Dennison et al.
2017/0230329 A1 * 8/2017 Akef ................... H04L 61/2076
2017/0295251 A1 10/2017 Kruglick
2018/0026999 A1 1/2018 Ruvio et al.
2018/0115571 A1 4/2018 Kahn et al.

FOREIGN PATENT DOCUMENTS

WO 2009/061588 A1 5/2009
WO 2014/021863 A1 2/2014
WO 2014/042645 A1 3/2014

OTHER PUBLICATIONS

Wikipedia, “Session (Computer Science)”, (2017) Retrieved on the Internet at https://en.wikipedia.org/wiki/Session_(computer_science), retrieved on Feb. 1, 2018, 5 pages.
Wikipedia, “HTTP cookie”, (2017) Retrieved on the Internet at https://en.wikipedia.org/wiki/HTTP_cookie, retrieved on Feb. 1, 2018, 5 pages.
Takahiro Hamada, Yuminobu Igarashi, Hideo Kitazume, Network System for Home Network Security in Cloud, IEICE Technical Report, The Institute of Electronics, Information and Communication Engineers, Sep. 4, 2014, vol. 114, No. 207, p. 105-110.

* cited by examiner

DETECTION OF AUTOMATED REQUESTS USING SESSION IDENTIFIERS

CROSS-REFERENCE TO RELATED APPLICATIONS

This application claims priority to U.S. Provisional Application Ser. No. 62/453,280 filed Feb. 1, 2017, which is incorporated herein by reference in its entirety for all purposes.

TECHNICAL FIELD

Various embodiments of the present technology generally relate to cybersecurity. More specifically, various embodiments of the present technology relate to detection of automated requests using session identifiers.

BACKGROUND

Web servers that provide web services are often subject to automated attacks, such as using stolen credentials to fraudulently access the service, brute-force attacks that try several username and password combinations to gain access, registering fake accounts, scraping websites to harvest web data, and others. Such velocity attacks typically require a large number of transactions with the web service in a very short period of time, and commonly used web browsers are prohibitively slow for such large-scale and high-speed communications. Instead, attackers use a wide variety of attack tools, ranging from simple shell scripts to sophisticated custom tools designed to speed up transactions.

Various types of network security devices work to protect web services and their components from being attacked by malicious actors, such as firewalls, intrusion prevention systems, and the like. Such devices inspect network traffic at varying degrees of depth, typically by matching incoming traffic data with a library of patterns and network protocol analyzers. Security researchers commonly update this pattern library continuously based on analysis of malware behavior at the network level. Typically, when traditional inline securities technologies detect malicious behavior, they simply block the connection in an attempt to thwart the attacker. Unfortunately, the attacker may then respond by changing the Internet Protocol (IP) address used for the connection or by employing a different attack tool, subjecting the web service to further attack.

OVERVIEW

Various embodiments of the present technology generally relate to cybersecurity. More specifically, various embodiments of the present technology relate to detection of automated requests using session identifiers. Some embodiments provide for a method that includes binding a session identifier to a user session with the web service. The method can further include receiving a plurality of web requests during the user session that include the session identifier. The method can further comprise processing the plurality of web requests with a set of automation detection heuristics to identify session attributes associated with the session identifier during the user session. When at least one of the session attributes associated with the session identifier exceeds a threshold amount, the method can identify that the session identifier is associated with an automated attack.

Embodiments of the present technology also include computer-readable storage media containing sets of instructions to cause one or more processors to perform the methods, variations of the methods, and other operations described herein.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

Figure 1:
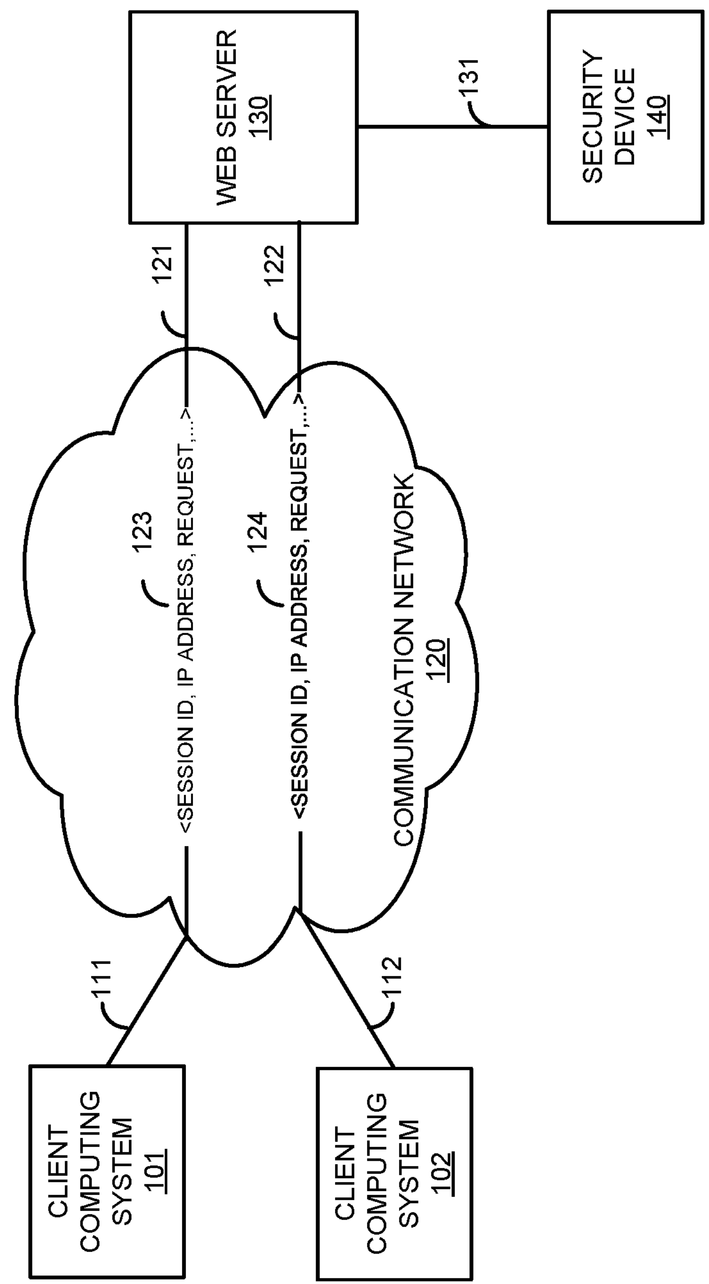
FIG. 1 is a block diagram that illustrates a communication system.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Malicious automation is increasingly becoming a large cybersecurity threat. Automation attacks may target various endpoints such as online websites, web servers, application programming interfaces (APIs), mobile APIs, and other web services. Using automation, attackers can submit a large volume of seemingly legitimate requests to a web service which follow the business logic of the application, and therefore can avoid triggering existing solutions like an intrusion detection system (IDS), firewall, and the like. For cybercriminals, various automation tools and scripts are readily available which can be used to automate web requests for malicious purposes.

These malicious automation attacks can involve testing out credentials from a source, such as a database of stolen credentials, brute-force credential guessing, scraping web content, automated account takeover attempts, and other malicious behavior. For example, an attacker may utilize automation to try out different credentials from a large database of credentials in an attempt to find working credentials for accounts on a website. Typically, these login attempts are legitimate syntactically and semantically, especially in isolation, making it difficult to detect the malicious intent of the attacker. In another example, a user may use automation tools to "scrape" and store web content from a website, such as a script used to check and aggregate flight prices.

Some solutions to these types of malicious automation attacks focus on the IP address associated with the attacks. For example, a web service may limit the number of requests or the data rate afforded to those requests based on the number of requests received from a particular IP address. In some cases, if an automated attack is detected, traditional network security measures may block all traffic from the originating IP address. However, this IP-based limiting and blocking can tip off the attacker to the mitigation effort, and the attacker may respond by simply changing the IP address used in the attacks. For example, attackers may employ techniques such as the use of cloud service providers, proxy servers, virtual private network (VPN) connections, botnets, and other alterations of the connection to continually change the IP address used in the attacks in an attempt to bypass IP-based security solutions.

Additionally, since a large portion of IP addresses are dynamically allocated, a particular IP address that was previously detected as associated with malicious use may later be reassigned to a different, legitimate user, and this legitimate user may experience blocked connections or might otherwise be affected by the previously-detected malicious activity associated with the IP address. Another problem with filtering traffic based on IP addresses is that certain network architectures can result in many false positives, such as the use of network address translation (NAT) that enables multiple machines to share the same external IP address. For example, if one of the machines behind a NAT is making automated requests and an IP-based solution detects this behavior as coming from a particular IP address, traffic will typically be rate-limited or blocked for all machines which are behind the NAT and hence, share this same IP address. Thus, traditional IP-based mitigation techniques of limiting and/or blocking connections based on their associated IP address is rendered largely ineffective and can be inaccurate.

In contrast, various embodiments of the present technology can assume that an attacker may utilize multiple different IP addresses during an attack, and thus do not rely on traditional IP address-based detection solutions. Instead, malicious requests can be identified as being associated with a common session using a session identifier, regardless of the IP addresses used in the requests. Various embodiments can facilitate detection of automated attacks on a web service.

In at least one implementation, a session identifier is bound to a user session with the web service, such as a cookie, API key, authentication token, or any other identifying information associated with the user session. Web requests can then be received during the user session which include the session identifier, enabling the web requests to all be correlated to the same user session based on the session identifier, regardless of their point of origin. The web requests can then be processed with a set of automation detection heuristics to identify session attributes associated with the session identifier during the user session. In some embodiments, the session attributes could include user/client behavior, connection behavior, presence, absence, format, and quantity of various data fields in the requests or request headers, and any other activity associated with the web requests. Based on analyzing these session attributes, the session identifier may be detected as being associated with an automated attack when at least one of the session attributes associated with the session identifier exceeds a threshold amount. Accordingly, steps can then be taken to mitigate the automated attack, such as by rejecting any subsequent requests that include the detected session identifier.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to automated threat assessments for web services, embodiments of the present technology are equally applicable to various other cloud-based services.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates a block diagram of communication system 100 that may be used in various embodiments of the present technology. As illustrated in FIG. 1, communication system 100 can includes client computing systems 101 and 102, communication network 120, web server 130, and security platform 140. Client computing systems 101 and 102 can include, but are not limited to, various computing devices such as desktop computers, tablet computers, laptop computers, notebook computers, mobile computing devices, mobile phones, mobile media devices, gaming devices, vehicle-based computers, wearable computing devices, server computers, virtual machines, as well as any other type of mobile computing devices and any combination or variation thereof.

Client computing systems 101 and 102 can include various network communication components that enable the devices to communicate with remote servers 130 or other portable electronic devices by transmitting and receiving wired or wireless signals (e.g., using licensed, semi-licensed or unlicensed spectrum over communications network 120). Client computing systems 101 and 102 may each individually comprise a processing system and communication transceiver. Client computing systems 101 and 102 may also include other components such as a user interface, data storage system, and power supply. Client computing systems 101 and 102 may each separately reside in a single device or may be distributed across multiple devices.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Web server 130 may be representative of any computing apparatus, system, or systems that may connect to another computing system over a communication network. Web server 130 can include a processing system and communication transceiver. Web server 130 may also include other components such as a router, server, data storage system, and power supply. Web server 130 may reside in a single device or may be distributed across multiple devices. Web server 130 may be a discrete system or may be integrated within other systems, including other systems within communication system 100. Some examples of web server 130 include desktop computers, server computers, cloud computing platforms, and virtual machines, as well as any other type of computing system, variation, or combination thereof. In some examples, web server 130 could comprise a network security appliance, active inline security device, passive detection system including a TAP or SPAN port, firewall, reverse proxy, load balancer, intrusion prevention system, web application firewall, web server, network switch, router, switching system, packet gateway, network gateway system, Internet access node, application server, database system, service node, or some other communication system, including combinations thereof.

As illustrated in FIG. 1, client computing system 101 and communication network 120 can communicate over communication link 111, while client computing system 102 and communication network 120 can communicate over communication link 112. Web server 130 is in communication with communication network 120 over communication links 121 and 122. In operation, client computing systems 101 and 102 can submit web requests 123 and 124 to web server 130 via communication network 120. In at least one implementation, a session identifier can be bound to a user session with the web service, such as a cookie, API key, authentication token, or any other identifying information associated with the user session.

Communication links 111, 112, and 121 can use metal, air, space, optical fiber such as glass or plastic, or some other material as the transport medium—including combinations thereof. Communication links 111, 112, and 121 could use various communication protocols, such as TDM, IP, Ethernet, telephony, optical networking, hybrid fiber coax (HFC), communication signaling, wireless protocols, or some other communication format, including combinations thereof. Communication links 111, 112, and 121 could be direct links or ay include intermediate networks, systems, or devices.

Web requests 123 and 124 can then be received during the user session which include the session identifier, enabling the web requests to all be correlated to the same user session based on the session identifier, regardless of their point of origin. The web requests can then be processed with a set of automation detection heuristics to identify session attributes associated with the session identifier during the user session.

As illustrated in FIG. 1, these automation detection heuristics can be performed by a security platform 140. Security platform 140 may be part of web server 130 (e.g., a software and/or hardware module) running in real-time (or near real-time) or a separate service running actively or passively inline picking off needed information or apart from web server 130. As such, in some embodiments, web server 130 may bundle web requests, session attributes, and other information for transmission to security platform 140 for analysis on a schedule (e.g., periodically, upon reaching a certain volume, etc.).

For example, the automation detection heuristics can be performed by passive security systems of web server 130 that perform deep analysis on a copy of the network traffic, such as a test access point (TAP) or switch port analyzer (SPAN) port. A TAP port is a passive splitting mechanism that utilizes separate dedicated channels to transmit and receive a copy of a network data stream to a monitoring device in real time, whereas a SPAN port, also referred to as a mirror port, receives a copy of network traffic from an enterprise switch which can then be monitored by an analysis device attached to the SPAN port. In another example, the automation detection heuristics could be included in a reverse proxy or load balancer used in the provision of the web service, where an active inline security module of web server 130 receives and analyzes network traffic from a plurality of users, such as client computing systems 101 and 102, before delivering it to the web service.

In some embodiments, the session attributes could include user/client behavior, connection behavior, presence, absence, format, and quantity of various data fields in the requests or request headers, and any other activity associated with the web requests. Based on analyzing these session attributes, the session identifier may be detected as being associated with an automated attack when at least one of the session attributes associated with the session identifier exceeds a threshold amount. Accordingly, steps can then be taken to mitigate the automated attack, such as by rejecting any subsequent requests that include the detected session identifier.

Figure 2:
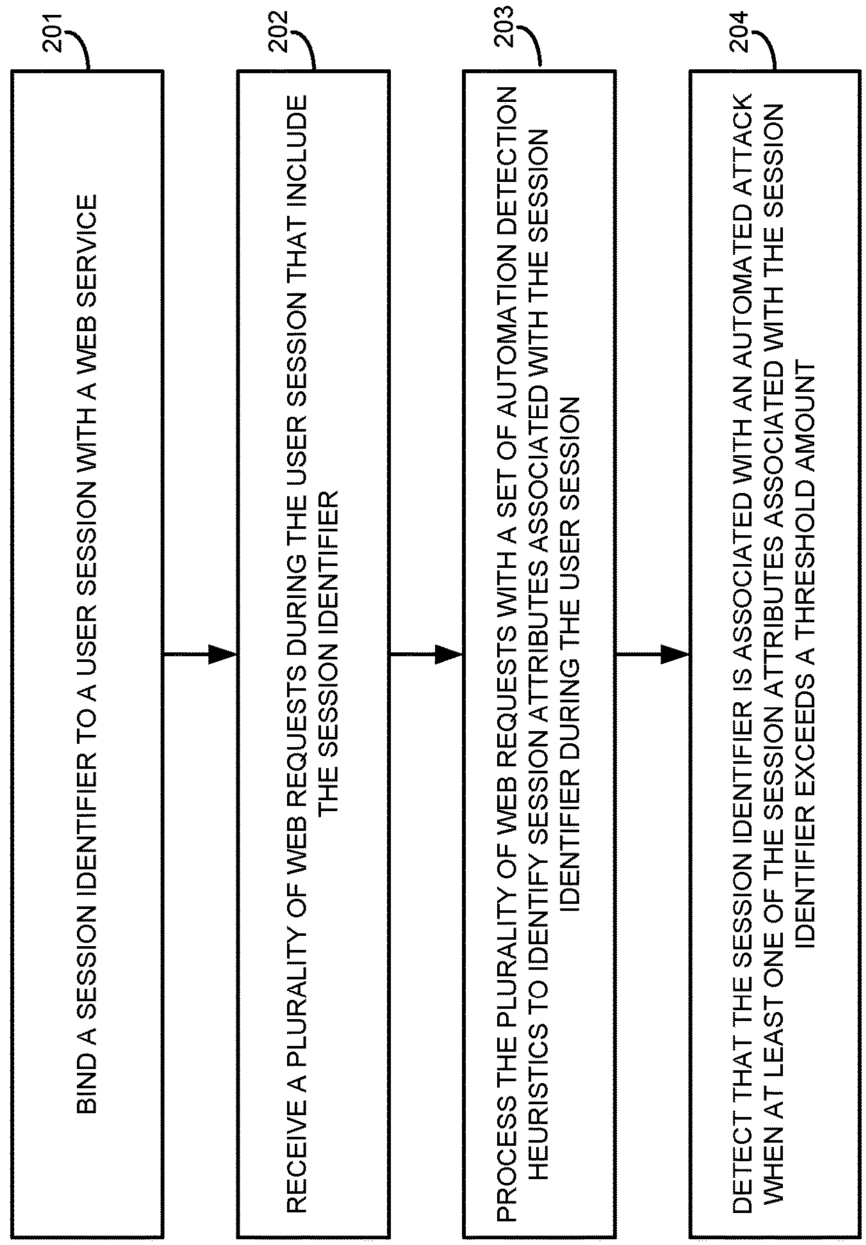
FIG. 2 is a flow diagram that illustrates an operation of the communication system.

FIG. 2 is a flow diagram that illustrates an operation 200 of communication system 100 in an exemplary implementation. Operation 200 may be employed to facilitate detection of automated attacks on a web service. Operation 200 shown in FIG. 2 may also be referred to as detection process 200 herein. The steps of the operation are indicated below parenthetically. In accordance with various embodiments, operation 200 may be performed by web server 130, such as according to a software module installed on web server 130, or could be executed by any other computing system or device in communication with web server 130, including distributed over many separate processing systems in diverse geographic locations. For example, operation 200 may be performed by an active inline security device configured to intercept network traffic en route to its final destination, which could be web server 130, another computing system, a cloud server, a mobile application server, an API flow, or any other computing resource.

The following discussion of operation 200 will proceed with reference to the elements of FIG. 1 in order to illustrate its operations, but note that the details provided in FIG. 1 are merely exemplary and not intended to limit the scope of process 200 to the specific implementation of FIG. 1. Moreover, the following description will simply refer to operation 200 as being performed by web server 130 to facilitate this discussion, which may include any of the above monitoring and analysis techniques, among others.

As shown in the operational flow of FIG. 2, web server 130 binds a session identifier to a user session with a web service (201). Session identifiers are typically used to track a session state for a user session with a server. In some examples, session identifiers could comprise cookies, API keys, authentication tokens, or any other identifying information associated with a user session. In the case of web traffic, the hypertext transfer protocol (HTTP) and HTTP Secure (HTTPS) are stateless protocols, meaning there is no notion of a session, and instead require the use of cookies to keep track of previous transactions in a sequence of requests. Cookies are key-pair values that are first "set" by the web server using the "Set-Cookies" HTTP header and then stored in the client browser. Cookies may store various information in the browser including data that may be used for tracking session state. Once stored, these key-pair values are sent with every subsequent HTTP request issued by the client.

In the case of API traffic, sessions are typically bound by API keys, which may comprise tokens provided to authorized users to access a service. Thus, regardless of whether the session identifier comprises a cookie, API key, authentication token, or some other identifying information, web server 130 can bind the session identifier to the user session, thereby creating a tightly linked association between the user session and the session identifier. For example, in some implementations, web server 130 may bind the session identifier to the user session by internally mapping the session identifier to that particular user session within web server 130. Notably, the session identifier is not bound to or associated with any particular IP address.

Web server 130 receives a plurality of web requests during the user session that include the session identifier (202). In the example of communication system 100, the web requests could be received from client computing systems 101 and 102, although the requests could originate from many more computing systems in other examples, and could be routed through various proxy servers, cloud service providers, VPN connections, botnets, and any other networks prior to being received by web server 130. Typically, the web requests comprise instructions to direct a web service to execute various functions on web server 130, such as login requests, storing or retrieving data, performing a checkout process to complete a purchase, or any other function provided by the web service. For example, the web requests could comprise queries, messages, notifications, commands, instructions, requests or any other communications between client computing systems 101-102 and web server 130, including combinations thereof. Each of the web requests received by web server 130 includes a session identifier, which in this example is the session identifier bound to the user session as discussed above. Of course, other web requests could be received by web server 130 that include a different session identifier and thus would not be associated with the user session, but may be bound to a different session.

Web server 130 processes the plurality of web requests with a set of automation detection heuristics to identify session attributes associated with the session identifier during the user session (203). Note that although this processing step is attributed to web server 130 in this discussion, the processing could also be performed by an active inline security device, passive detection systems including TAP and SPAN ports, and other methods, which may be incorporated within web server 130 in some examples. In at least one implementation, web server 130 processes the plurality of web requests with the set of automation detection heuristics to identify session attributes associated with the session identifier during the user session over a specified time period.

For example, the session attributes could include user/client behavior, connection behavior, presence, absence, format, and quantity of various data fields in the requests or request headers, and any other activity associated with the web requests. In some examples, the session attributes could comprise a quantity of different credentials submitted in login requests associated with the session identifier, a quantity of different IP addresses associated with the session identifier, a quantity of requests associated with the session identifier, a quantity of different User-Agent strings associated with the session identifier, a quantity of Operating System (OS) fingerprints, a quantity of security fingerprints associated with the session identifier such as Secure Socket Layer (SSL) fingerprints and/or Transport Layer Security (TLS) fingerprints, a quantity of HTTP fingerprints associated with the session identifier, requests with blank or missing session identifiers, or any other properties and characteristics that may be gleaned from the web requests associated with the session identifier during the user session. The automation detection heuristics work to identify these session attributes. Several examples of automation detection heuristics will now be discussed.

In one example, one detection heuristic could include identifying a session attribute comprising a quantity of different credentials submitted in login requests associated with the session identifier. As with any of the automation detection heuristics, web server 130 could be configured to identify a quantity of different credentials submitted in login requests associated with the session identifier over a specified time period. For example, web server 130 could process the plurality of web requests to identify how many different user identifiers were included in login requests associated with the same session identifier.

In another example, web server 130 could process the plurality of web requests to identify how many different passwords were tried for the same user identifier in login requests associated with the session identifier. In either case, the larger the quantity of different usernames and/or passwords submitted in login requests associated with the same session identifier, the higher the likelihood that the session identifier is associated with an automated attack. This is because, in an exemplary use case, a legitimate user might have a few different accounts with the same email provider, such as personal and work email accounts, and thus may only submit a limited number of different credentials for the same service until they successfully log in or give up.

In another example, a legitimate user would typically only have a single username for logging in to a web service, and thus only one username would be associated with a session identifier when the user logs in to the service during a session. However, a malicious user employing an automated attack tool to discover working credentials for a service would typically utilize a large credential database, so there would be many more login attempts trying several different usernames and/or passwords associated with the same session identifier. Accordingly, a threshold amount of different user identifiers and/or passwords or any other type of credentials submitted in web requests having the same session identifier could be set which, when exceeded, enables web server 130 to detect that the session identifier is associated with an automated attack. The threshold amount, and any time period over which the number of user identifiers are tracked per session identifier, can be customized and configured according to the specific needs of the particular site or use case.

In another example, an automation detection heuristic could include identifying a session attribute comprising a quantity of different IP addresses associated with the session identifier. As with any of the automation detection heuristics, web server 130 could be configured to identify a quantity of different IP addresses associated with the session identifier over a specified time period. Typically, the larger the quantity of different IP addresses associated with the same session identifier, the higher the likelihood that the session identifier is associated with an automated attack. This is because, in a typical use case, a legitimate user might use a few different devices to access a service, such as a home computer, work laptop, a smartphone, and a tablet. The user session might be distributed over these different devices, and the server could be reusing the same session identifier or generating different ones for each device, each internally linked to the same user.

However, a malicious user employing an automated attack tool might enter a long list of connection modifiers, such as different proxy servers, tor exit nodes, VPNs, cloud service providers, or any other alterations to the connection, any of which may result in a different IP address exposed for the connection. The tool then tries to make requests while cycling through these different connection modifiers in an effort to continually change the IP address used in the requests. Thus, a large quantity of different IP addresses may be used to make requests with the same session identifier token, typically in a small time window, which is highly suspicious behavior and characteristic of malicious activity. Accordingly, a threshold amount of different IP addresses used to submit web requests having the same session identifier could be set which, when exceeded, enables web server 130 to detect that the session identifier is associated with an automated attack.

The threshold amount, and any time period over which the number of IP addresses are tracked per session identifier, can be customized and configured according to the specific needs of the particular site or use case. Note that while this heuristic would work well for HTTP requests, this technique may yield a false positive for an API flow, since the API key could be distributed around by different developers in the same organization, all of which may use different IP addresses that would then be associated with the same session identifier/API key.

Another example automation detection heuristic could involve identifying a session attribute comprising a quantity of requests associated with the session identifier. As with any of the automation detection heuristics, web server 130 could be configured to identify a quantity of requests associated with the session identifier over a specified time period. Typically, the larger the quantity of requests associated with the same session identifier, the higher the likelihood that the session identifier is associated with an automated attack. This is because, in a typical use case, a legitimate human user might click through a web page at a relatively slow pace, without generating a lot of requests. However, a malicious user might employ a script that operates in a much faster manner since it is not limited by the latency of human senses, thereby generating a very large number of requests.

For example, a script could be employed to "scrape" a website by leveraging automation to request and store the web content provided by the website. Thus, a large quantity of requests that are associated with the same session identifier, typically in a small time frame, is highly suspicious behavior and may be indicative of malicious activity. Accordingly, a threshold amount of web requests having the same session identifier could be set which, when exceeded, enables web server 130 to detect that the session identifier is associated with an automated attack. The threshold amount, and any time period over which the number of requests are tracked per session identifier, can be customized and configured according to the specific needs of the particular site or use case.

Another example of an automation detection heuristic could include identifying automated scraping associated with the session identifier. For example, attackers can often log into a website (e.g., a job portal, social media website, etc) and inject a script for scraping. By logging in, the attacker can have access to more information that would otherwise be publicly available. Unlike a legitimate user perform various searches and updating query terms, a scraper often injects a script that just updates or indexes a portion of the URL (e.g., at www.ABC.com/page=2 the script may simply update the numerical value at the end). As each page is presented the information is scraped. Some embodiments use the session ID created by the login to track the number of page fetches compared to the number of searches. When the page fetches greatly exceed the number of search queries the automation detection heuristic can identify a potential threat. In some embodiments, the automation detection heuristic may also use other factors such as, but not limited to, amount of time spent on each page, fingerprints, sequential versus non-sequential indexing, updated search queries, and the like in determining whether automated scaping is occurring.

In another example, an automation detection heuristic could include identifying a session attribute comprising a quantity of different User-Agent strings associated with the session identifier. A User-Agent string is a short string that web browsers and other applications include in web requests to identify themselves to web servers. As with any of the automation detection heuristics, web server 130 could be configured to identify a quantity of different User-Agent strings submitted in web requests associated with the session identifier over a specified time period. Typically, the larger the quantity of different User-Agent strings submitted in web requests associated with the same session identifier, the higher the likelihood that the session identifier is associated with an automated attack. This is because a user session for a legitimate user would commonly exhibit a small set of User-Agent strings (typically just one User-Agent string for a user accessing a website using a single web browser).

However, a malicious user employing automated attack tools might deploy requests having various User-Agent strings from multiple browsers, applications, and devices. Thus, a large quantity of different User-Agent strings in web requests that are associated with the same session identifier, typically in a small time frame, is highly suspicious behavior and may be indicative of malicious activity. Accordingly, a threshold amount of different User-Agent strings in web requests having the same session identifier could be set which, when exceeded, enables web server 130 to detect that the session identifier is associated with an automated attack. The threshold amount, and any time period over which the different User-Agent strings in web requests are tracked per session identifier, can be customized and configured according to the specific needs of the particular site or use case.

Another example automation detection heuristic could involve identifying a session attribute comprising a quantity of different OS fingerprints associated with the session identifier. An OS fingerprint is a well-known technique to identify an OS from the transmission control protocol (TCP) packet characteristics. As with any of the automation detection heuristics, web server 130 could be configured to identify a quantity of different OS fingerprints associated with the session identifier over a specified time period. Typically, the larger the quantity of different OS fingerprints associated with the same session identifier, the higher the likelihood that the session identifier is associated with an automated attack. This is because, in a typical use case, a legitimate user session would only exhibit a single OS fingerprint for the OS the user is utilizing.

However, a malicious user employing automated attack tools might deploy requests having various OS fingerprints from multiple systems and devices, including virtual machines and cloud servers. Thus, a large quantity of different OS fingerprints in web requests that are associated with the same session identifier, typically in a small time frame, is highly suspicious behavior and may be indicative of a velocity attack. Accordingly, a threshold amount of different OS fingerprints in web requests having the same session identifier could be set which, when exceeded, enables web server 130 to detect that the session identifier is associated with an automated attack. The threshold amount, and any time period over which the different OS fingerprints in web requests are tracked per session identifier, can be customized and configured according to the specific needs of the particular site or use case.

In another example, an automation detection heuristic could include identifying a session attribute comprising a quantity of different security fingerprints associated with the session identifier. A security fingerprint may be determined from characteristics of the SSL/TLS Client-Hello message to identify the SSL/TLS client, which is typically a web browser. For example, a Client-Hello message transmitted by the client typically identifies the SSL/TLS protocol versions it supports, includes a session identifier, and lists the supported cipher suites and compression methods, among other security information. Different security parameters in the Client-Hello messages received in the web requests can be used to generate unique security fingerprints for identifying different clients/browsers. For example, differences in the particular cipher suites listed, the number of cipher suites, the order of the cipher suites, and the other attributes of the client hello message, such as the SSL/TLS protocol versions, RSA key size, Diffie-Hellman (DH) parameter size, elliptical curves, certificate signature, HTTP Strict Transport Security (HSTS), and other parameters listed in the Client-Hello messages can be used to generate the security fingerprints.

As with any of the automation detection heuristics, web server 130 could be configured to identify a quantity of security fingerprints associated with the session identifier over a specified time period. Typically, the larger the quantity of security fingerprints associated with the same session identifier, the higher the likelihood that the session identifier is associated with an automated attack. This is because a user session for a legitimate user would commonly exhibit a small set of security fingerprints, as they are tightly linked to a particular OS/browser/machine combination (typically just one security fingerprint for a user accessing a website using a single web browser). However, a malicious user employing automated attack tools might deploy requests having various security fingerprints from multiple browsers, applications, and devices. Thus, a large quantity of different security fingerprints in web requests that are associated with the same session identifier, typically in a small time frame, is highly suspicious behavior and may be indicative of malicious activity. Accordingly, a threshold amount of different security fingerprints in web requests having the same session identifier could be set which, when exceeded, enables web server 130 to detect that the session identifier is associated with an automated attack. The threshold amount, and any time period over which the different security fingerprints in web requests are tracked per session identifier, can be customized and configured according to the specific needs of the particular site or use case.

Another example of an automation detection heuristic could include identifying a session attribute comprising a quantity of different HTTP fingerprints associated with the session identifier. An HTTP fingerprint may be determined from characteristics of HTTP requests, such as the order and contents of the fields in HTTP headers included in a web request and the connection behavior of the client when interacting with the web server 130. For example, an HTTP request sent by client may include multiple header fields such as Host, Accept, and Accept-Encoding, among others. Some of these fields are optional and therefore will not always be included in an HTTP request header. Thus, the particular fields that are included in the HTTP request header, and the order in which these fields are presented, may be factored in when determining an HTTP fingerprint for a particular web request.

An HTTP fingerprint could also be generated based on capabilities supported by a client as indicated in the fields of the HTTP request header. For example, the protocols, versions, languages, and other features that the browser supports may also be listed in the HTTP header fields, such as support for various scripting languages, Flash® media, compression algorithms, and others, and all of this information in an HTTP request may be used to generate a unique HTTP fingerprint for a particular request. As with any of the automation detection heuristics, web server 130 could be configured to identify a quantity of different HTTP fingerprints associated with the session identifier over a specified time period.

Typically, the larger the quantity of HTTP fingerprints associated with the same session identifier, the higher the likelihood that the session identifier is associated with an automated attack. This is because a user session for a legitimate user would commonly exhibit a small set of HTTP fingerprints, as they are tightly linked to a particular OS/browser/machine combination (typically just one HTTP fingerprint for a user accessing a website using a single web browser). However, a malicious user employing automated attack tools might deploy requests having various HTTP fingerprints from multiple browsers, applications, and devices. Thus, a large quantity of different HTTP fingerprints in web requests that are associated with the same session identifier, typically in a small time frame, is highly suspicious behavior and may be indicative of a velocity attack. Accordingly, a threshold amount of different HTTP fingerprints in web requests having the same session identifier could be set which, when exceeded, enables web server 130 to detect that the session identifier is associated with an automated attack. The threshold amount, and any time period over which the different HTTP fingerprints in web requests are tracked per session identifier, can be customized and configured according to the specific needs of the particular site or use case.

In another example, an automation detection heuristic could include identifying a session attribute comprising blank or missing session identifiers in the web requests. As with any of the automation detection heuristics, web server 130 could be configured to identify blank or missing session identifiers in the web requests over a specified time period. Generally, any quantity of blank session identifiers in web requests is indicative of an automated attack. This is because a legitimate web browser would not send out a request without a session identifier in a certain part of the request/response flow, assuming the session identifier had already been set by the server.

However, for an attack tool, there might be missing session identifiers due to reasons like human error on the part of the attacker or a broken script or misconfiguration of the attack tool. Thus, any request without a session identifier is anomalous and indicative of an automated attack. In this case, a threshold amount of missing session identifiers in web requests could be set, which would likely be zero, so that when exceeded, web server 130 is able to detect that the session identifier is associated with an automated attack. The threshold amount, and any time period over which the missing session identifiers in web requests are tracked, can be customized and configured according to the specific needs of the particular site or use case.

As will be appreciated by one of skill in the art, the automation detection heuristics described above are merely exemplary, and many other heuristics may be employed in the framework disclosed herein for detecting suspicious web requests having the same session identifier that may be associated with an automated attack, and are included within the scope of this disclosure.

Web server 130 detects that the session identifier is associated with an automated attack when at least one of the session attributes associated with the session identifier exceeds a threshold amount (204). As discussed above, various session attributes associated with the session identifier may be determined during the user session based on processing the web requests with a set of automation detection heuristics. Each of the different session attributes identified may have a different threshold amount for each type of attribute.

For example, a threshold of five could be set for the quantity of different user identifiers submitted in login requests associated with the session identifier, and a threshold of ten could be set for the quantity of different IP addresses associated with the session identifier. Further, combinations of different session attributes associated with the session identifier may provide for lower threshold requirements for each of these attributes than when analyzed in isolation, which may be achieved by applying weights or other prioritizations to each of the session attributes identified. In general, the larger the quantity of a particular session attribute, the higher the likelihood that the session attribute is indicative of automation activity for the associated session identifier. Accordingly, by setting customized threshold amounts for each use case and specific to a particular site, a web service provider can better secure the web service from automated attacks.

Figure 3:
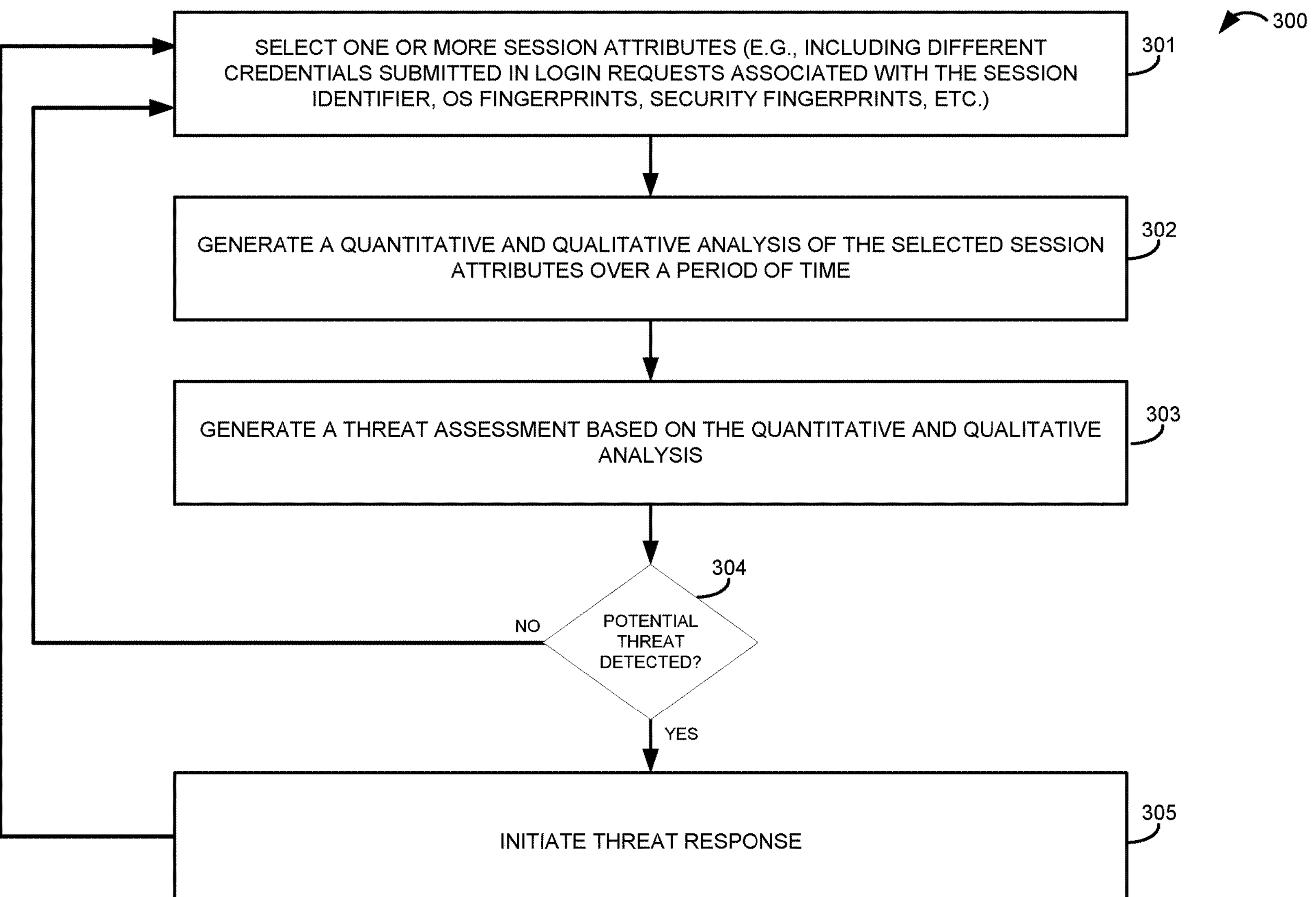
FIG. 3 is a flow diagram illustrating a set of operations for detecting and responding to potential threats or undesired activity.

FIG. 3 illustrate an example of a set of operations 300 for identifying a potential threat (e.g., a distributed automated attack, web scraping, etc.) using an assessment heuristic. The operations illustrated in FIG. 3 can be performed by various systems (e.g., security device, hardware module, software module, etc.) and components (e.g., processors, ASICS, etc.). As illustrated in FIG. 3, selection operation 301 can select one or more session attributes for analysis. Generation operation 302 can generate a quantitative and/or qualitative analysis of the selected session attributes over a period of time. Using this analysis, a threat assessment can be generated using assessment operation 303. In some embodiments, assessment operation 303 can combine multiple individual analysis (e.g., using various weights, as inputs to a machine learning algorithm, or the like).

Determination operation 304 can determine whether a potential threat or undesired activity has been detected. When determination operation 304 determines that no threat or undesired activity is present, then determination operation 304 branches to selection operation 301 for continued monitoring. When determination operation 304 determines that a threat or undesired activity is present, then determination operation 304 branches to response operation 305 where a response to the threat is initiated.

Advantageously, web requests can be tracked per session identifier to associate the web requests with a particular user session, regardless of the number of different IP addresses used in making the requests. By applying automation detection heuristics to the web requests to identify the session attributes, and then comparing one or more of the session attributes identified to their corresponding threshold amounts, web server 130 and/or active or passive security solutions can effectively detect an automation attack that is associated with a particular session identifier. In this manner, attackers who employ tools and techniques to frequently alter the IP addresses used in the attacks in an effort to bypass traditional IP address-based security solutions can still be detected and blocked, thereby providing improved protection for web service providers and better safeguarding of user data.

Figure 4:
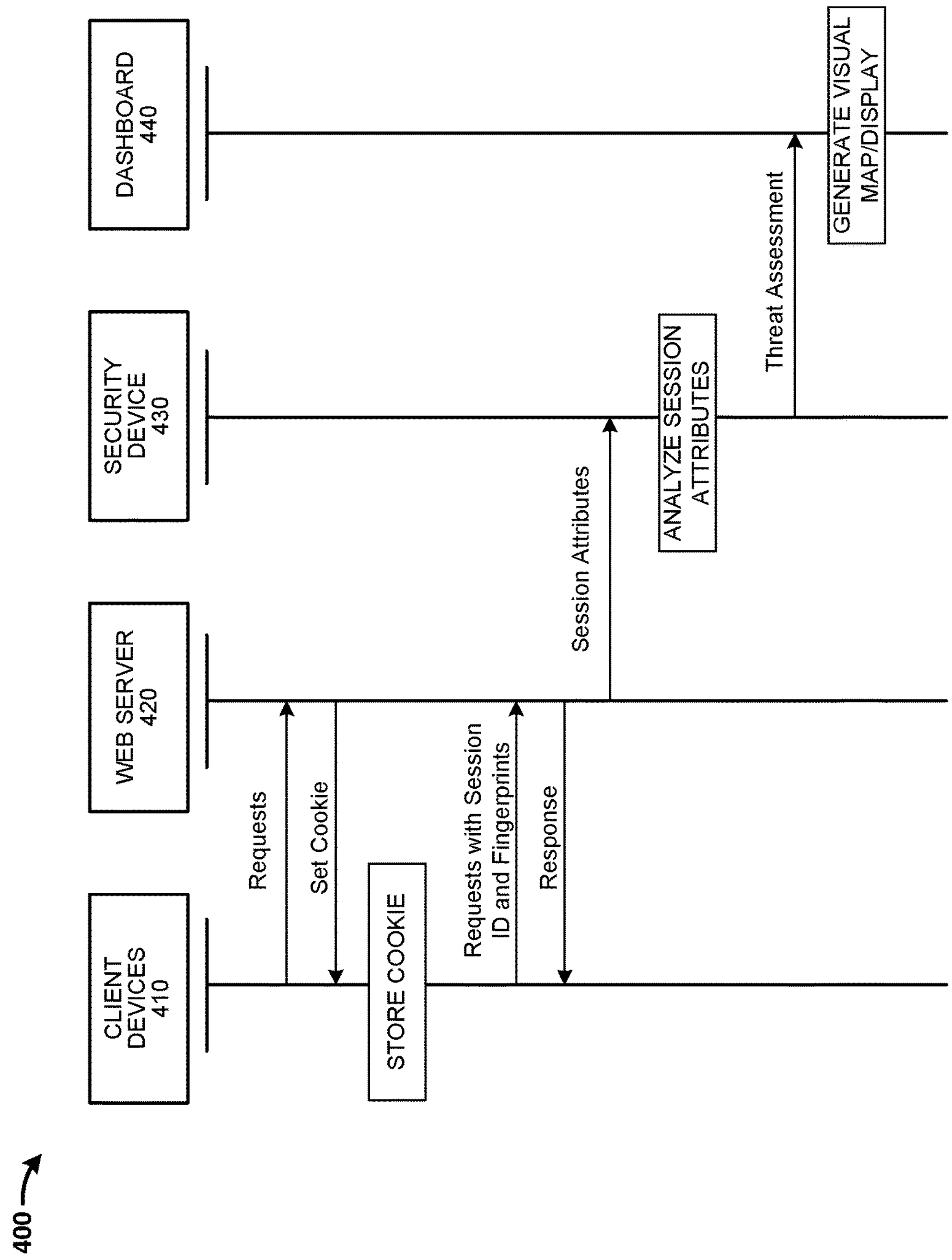
FIG. 4 is a sequence diagram illustrating communications between various components within the communication system.

FIG. 4 is a sequence diagram 400 illustrating communications between various components within the communication system. Various embodiments of the automation detection techniques disclosed herein assume that attackers are capable of frequently changing the IP addresses used in their attacks, enabling them to bypass traditional IP address-based heuristics like tracking the number of requests coming from the same IP address and then throttling or blocking the traffic from that IP address. However, the automation detection heuristics disclosed herein are session-based, which instead track requests based on session identifiers or session tokens. In the case of web traffic, the HTTP protocol is stateless, meaning it is designed to simply create a connection to the server and terminate.

In order to keep track of previous transactions in a sequence of requests, cookies are stored on a user's computer 410 and are sent with every request to web server 420, such as login requests, form submissions, requests to store or retrieve data, posts, page navigations, and the like. These cookies comprise key-pair values that are initially set by the web server using the "Set-Cookie" HTTP header and are then typically stored in the client browser. The client browser then includes these key-pair values with every subsequent HTTP request sent to the server. Cookies are used to store all sorts of information in the client browser including for tracking user sessions and session states. Security device 430 can analyze session attributes to generate a threat assessment for communications with a common session identifier. The threat assessment and relevant information can then be displayed on dashboard 440.

In the examples discussed herein, session identifiers could comprise any security token or other identifiable information included in requests sent to a server that may be used to track user sessions. In the case of HTTP web traffic, this is achieved by the use of cookies, as discussed above. A typical flow for web requests involves the web server generating a new cookie for a client when a web request is first received from the client. The cookie is then sent to the client 410 using the "Set-Cookie" HTTP header. The session identifier might then be updated after a successful login request by the client. This token is internally mapped to that particular user's session within the server 420. Thereafter, whenever the client sends a request with that session identifier cookie, the server knows the authentication and authorization state of that particular user.

In the case of API traffic, sessions are typically bound by API keys. API traffic may include different types of API calls, such as mobile API requests, company trusted exchanges, and any other API flows. For example, a company may sign up for a service and receive an API key from the service provider to access the service. Every machine in the company may then use that API key to access the service, typically over several different IP addresses, making it difficult to detect if an attack has stolen the API key and is using it on another IP address outside of the company. However, by monitoring all of the activity associated with that API key to identify session attributes using a set of session-based automation detection heuristics, suspicious automation behavior may be detected for the API key. Thus, the session identifiers discussed herein could comprise any authentication token or identifiable information bound to a user session, and there might be different implementations of this idea including cookies and API keys. Since session identifiers are tightly linked to the user session, they are less likely to change and are not bound to the IP addresses used during the session. In the case of legitimate user-based sessions, typically there would only be one session token per IP address.

Some typical web request flows for a legitimate human user and an attack tool will now be discussed. For a typical legitimate user flow, the user may access a website using a web browser, and if the server finds no existing cookies for the browser, sets a new cookie using the "Set-Cookie" header. The user then attempts to authenticate to the website. Upon successful authentication, the server 420 either binds the cookie to the authenticated user session, or generates a new set of authenticated cookies for use with the session, or a combination of both. The server 420 then typically sets an expiration timer on the cookie so that the user does not have to authenticate again for the specified amount of time.

However, the common flow for an attack tool operates differently. Using a configuration file, the attacker typically provides a target website server, a set of credentials to be tried, and a list of proxy servers. The configuration file contains all of the settings necessary to configure the attack tool for carrying out a particular attack on the website. The proxy servers specified in the configuration file are typically computing systems having different IP addresses that act as relays for the attacker's web requests, in order to conceal the attacker's true IP address. The tool then typically sends a "GET" request to load resources from the website, as well as establish the session, by accepting the session identifier/cookie. Each subsequent request then tries to authenticate to the website using the same cookie. Many of these requests are distributed over different IP addresses, as the tool is typically configured to cycle through the various different proxy sites.

The requests typically comprise login requests using different credentials, and the attack tool continues submitting these requests until a successful login is found. It then records the success, discards the cookie and starts over with a new one. Thus, the attack tool is designed to "rotate" the IP addresses by using proxies. However, unlike an IP address, the session identifier/cookie is tightly integrated with the session. Thus, these types of attack tools are forced to use the same session identifiers, even though they are continually changing the IP addresses for the request and the requests may be traveling completely different routes to the server. Similarly, for API traffic, the session identifiers/API keys are assigned to each individual developer or other trusted API user. Thus, attackers cannot easily generate new API keys to use in subsequent requests as is done with IP addresses, and therefore malicious automation attacks can be detected by tracking suspicious activity linked to the same API key through session-based detection heuristics, regardless of how many times the attacker changes the IP addresses used in the requests.

Figure 5:
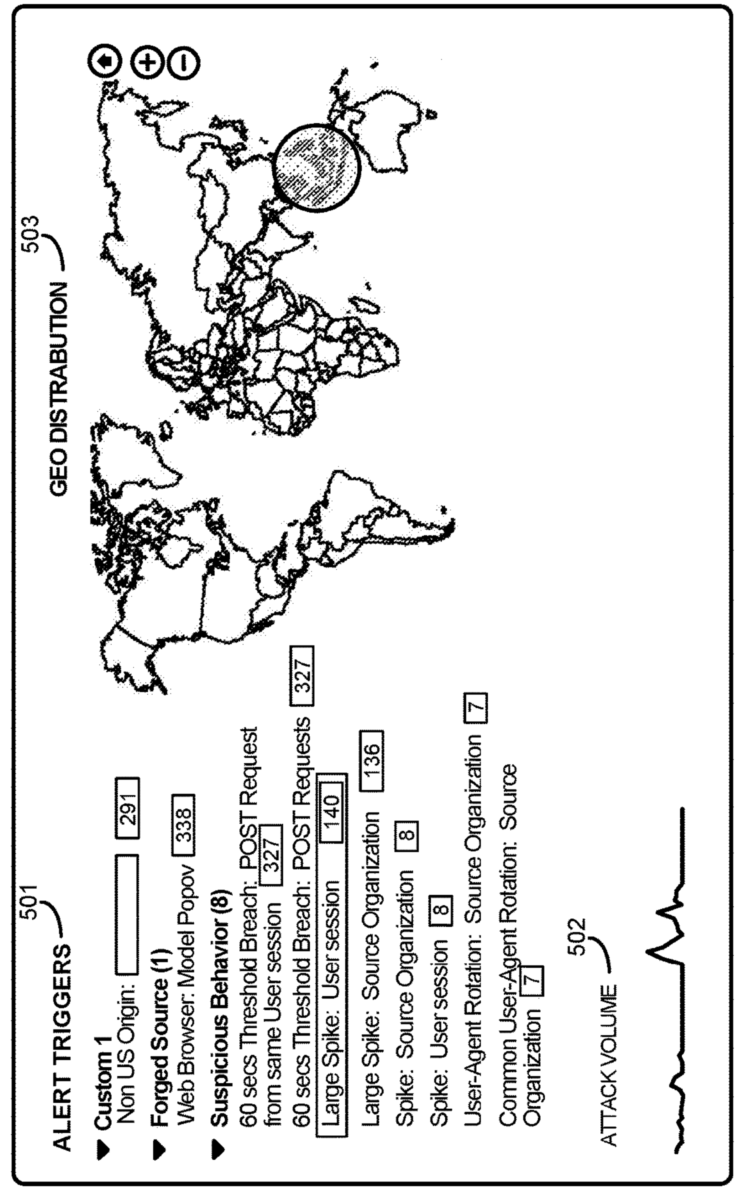
FIG. 5 is a dashboard illustrating a large spike of user sessions within a live attack.

FIG. 5 is a dashboard 500 illustrating a large spike of user sessions within a live attack. As illustrated in FIG. 5, dashboard 500 can include a first window 501 listing various triggers providing updates as the session attributes are processed. These triggers can include custom triggers created by the user, indications of forged sources, suspicious behavior triggers (e.g., including large spikes of user session), and the like. Dashboard 500 can also include a second window 502 with a graph indicating the attack volume over time and a third window 503 providing a visual distribution of the attacks.

Figure 6:
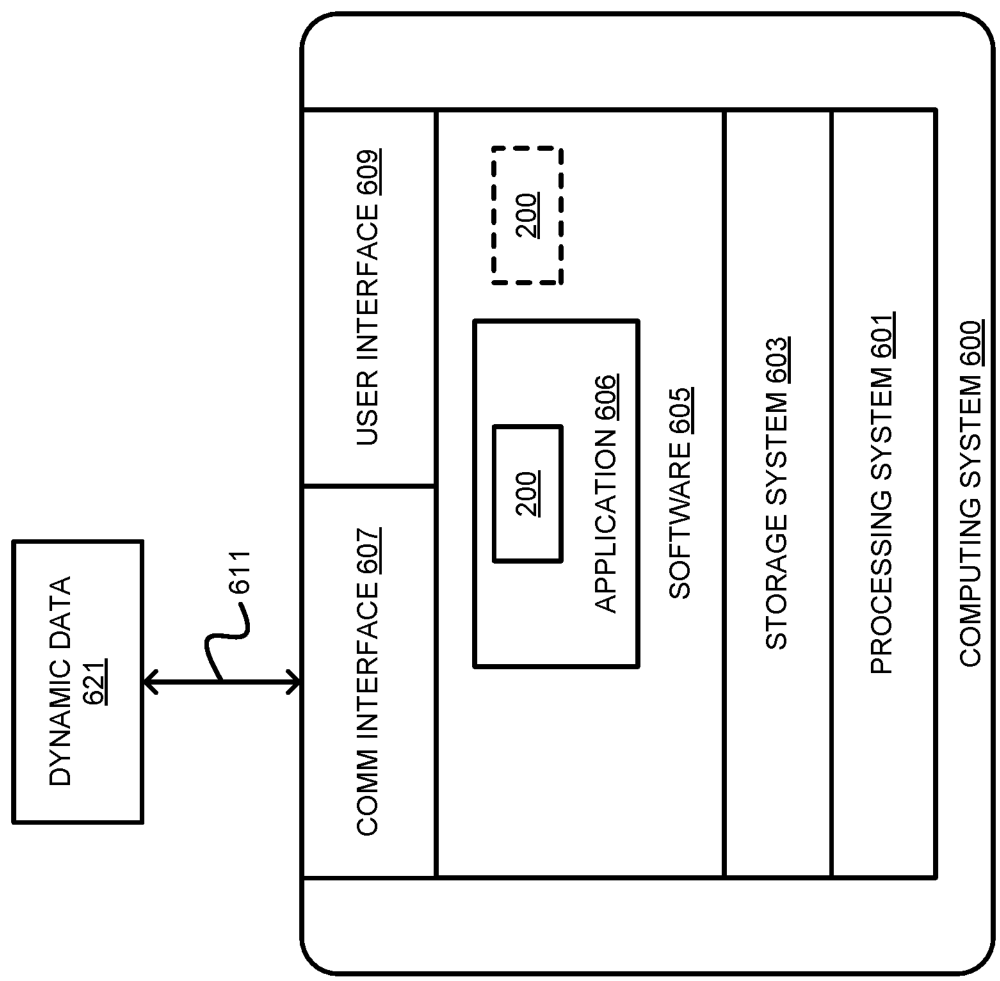
FIG. 6 is a block diagram that illustrates a computing system.

Referring now to FIG. 6, a block diagram that illustrates computing system 600 in an exemplary implementation is shown. Computing system 600 provides an example of web server 130 or any computing system that may be used to execute detection process 200 or variations thereof, although such systems could use alternative configurations. Computing system 600 includes processing system 601, storage system 603, software 605, communication interface 607, and user interface 609. Software 605 includes application 606 which itself includes detection process 200. Detection process 200 may optionally be implemented separately from application 606.

Computing system 600 may be representative of any computing apparatus, system, or systems on which application 606 and detection process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for detection process 200 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer readable media or storage media readable by processing system 601 and capable of storing software 605. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 609, processing system 601 loads and executes portions of software 605, such as detection process 200, to facilitate detection of automated attacks on a web service. Software 605 may be implemented in program instructions and among other functions may, when executed by computing system 600 in general or processing system 601 in particular, direct computing system 600 or processing system 601 to bind a session identifier to a user session with the web service. Software 605 may further direct computing system 600 or processing system 601 to receive a plurality of web requests during the user session that include the session identifier. Further, software 605 may direct computing system 600 or processing system 601 to process the plurality of web requests with a set of automation detection heuristics to identify session attributes associated with the session identifier during the user session. Software 605 also directs computing system 600 or processing system 601 to detect that the session identifier is associated with an automated attack when at least one of the session attributes associated with the session identifier exceeds a threshold amount.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate detection of automated attacks on a web service as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-readable storage media are characterized as primary or secondary storage.

In some examples, if the computer-readable storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or detection process 200 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method to facilitate detection of automated attacks on a web service, the method comprising:

binding a session identifier to a user session with the web service;

receiving a plurality of requests during the user session that include the session identifier, wherein the plurality of requests are associated with more than one Internet Protocol (IP) address;

correlating the plurality of requests to the user session based on the session identifier included in the plurality of requests received during the user session;

processing the plurality of requests with a set of automation detection heuristics to identify session attributes associated with the session identifier during the user session, wherein the session attributes comprise connection behavior associated with the requests, including presence, absence, format, and quantity of data fields associated with the requests; and detecting that the session identifier is associated with an automated attack when at least one of the session attributes associated with the session identifier exceeds a threshold amount.

2. The method of claim 1, further comprising rejecting, in response to detecting that the session identifier is associated with the automated attack, any subsequent requests that include the session identifier.

3. The method of claim 1, further comprising generating a dashboard that includes a dynamically updated list of triggers and a geographical distribution of IP addresses of the automated attack.

4. The method of claim 1, wherein binding a session identifier to the user session with the web service includes the web service generating a new cookie with a key-pair value in response to a first request from a client.

5. The method of claim 1, wherein the session attributes associated with the session identifier include user-client behavior, quantity of different credentials submitted in login requests, quantity of different IP addresses, quantity of different User-Agent strings, quantity of different operating system fingerprints, quantity of different security fingerprints, quantity of different HTTP fingerprints, or requests with blank or missing session identifiers in the plurality of requests.

6. The method of claim 1, wherein processing the plurality of requests to identify session attributes associated with the session identifier during the user session includes identifying a quantity of different HTTP fingerprints associated with the session identifier.

7. A security device to facilitate detection of automated attacks on a web service, the security device comprising:

a processing system configured to bind a session identifier to a user session with the web service;

a communication interface configured to receive a plurality of requests during the user session that include the session identifier, wherein the plurality of requests are associated with more than one Internet Protocol (IP) address; and wherein the processing system is further configured to correlate the plurality of requests to the user session based on the session identifier included in the plurality of requests received during the user session, process the plurality of requests with a set of automation detection heuristics to identify session attributes associated with the session identifier during the user session, wherein the session attributes comprise connection behavior associated with the requests, including presence, absence, format, and quantity of data fields associated with the requests, and detect that the session identifier is associated with an automated attack when at least one of the session attributes associated with the session identifier exceeds a threshold amount.

8. The security device of claim 7, wherein the security device is part of a passive security system of the web service and wherein the plurality of web requests are copies of network traffic.

9. The security device of claim 7, wherein the set of automation detection heuristics are included in a reverse proxy or load balancer used in provisioning of the web service.

10. The security device of claim 7, wherein the processing system is further configured to reject, in response to detecting that the session identifier is associated with the automated attack, any subsequent requests that include the session identifier.

11. The security device of claim 7, wherein the session attributes associated with the session identifier include user-client behavior, quantity of different credentials submitted in login requests, quantity of different IP addresses, quantity of different User-Agent strings, quantity of different operating system fingerprints, quantity of different security fingerprints, quantity of different HTTP fingerprints, or requests with blank or missing session identifiers in the plurality of requests.

12. The security device of claim 7, wherein the processing system is further configured to generate a dashboard that includes a dynamically updated list of triggers and a geographical distribution of IP addresses of the automated attack.

13. The security device of claim 7, wherein the processing system binds the session identifier to the user session with the web service using a cookie, an API key, or an authentication token.

14. The security device of claim 7, wherein the set of automation detection heuristics includes comparing a number of search queries per number of fetched pages over a period of time for the session identifier.

15. The security device of claim 7, wherein the threshold amount is set by a user and is dependent on a type of the session identifier.

16. One or more non-transitory computer-readable storage media having instructions stored thereon to facilitate detection of automated attacks on a web service, wherein the instructions, when executed by one or more processors, cause a machine to at least:

bind a session identifier to a user session with the web service;

receive a plurality of requests during the user session that include the session identifier, wherein the plurality of requests are associated with more than one Internet Protocol (IP) address;

correlate the plurality of requests to the user session based on the session identifier included in the plurality of requests received during the user session;

process the plurality of requests with a set of automation detection heuristics to identify session attributes associated with the session identifier during the user session, wherein the session attributes comprise connection behavior associated with the requests, including presence, absence, format, and quantity of data fields associated with the requests; and detect that the session identifier is associated with an automated attack when at least one of the session attributes associated with the session identifier exceeds a threshold amount.

17. The one or more non-transitory computer-readable storage media of claim 16, wherein the session attributes associated with the session identifier include user-client behavior, quantity of different credentials submitted in login requests, quantity of different IP addresses, quantity of different User-Agent strings, quantity of different operating system fingerprints, quantity of different security fingerprints, quantity of different HTTP fingerprints, or requests with blank or missing session identifiers in the plurality of requests.

18. The one or more non-transitory computer-readable storage media of claim 16, wherein the instructions when executed by the one or more processors further cause the machine to reject, in response to detecting that the session identifier is associated with the automated attack, any subsequent requests that include the session identifier.

19. The one or more non-transitory computer-readable storage media of claim 16, wherein the instructions when executed by the one or more processors further cause the machine to generate a dashboard that includes a dynamically updated list of triggers and a geographical distribution of IP addresses of the automated attack.

20. The one or more non-transitory computer-readable storage media of claim 16, wherein the instructions when executed by the one or more processors further cause the machine to bind the session identifier to the user session with the web service using a cookie, an API key, or an authentication token.

* * * * *